(12) United States Patent
Köster et al.

(10) Patent No.: US 10,876,659 B2
(45) Date of Patent: Dec. 29, 2020

(54) ARRANGEMENT FOR FLUID-SEALING CONNECTION OF LINES

(71) Applicant: Hanon Systems, Daejeon (KR)

(72) Inventors: Stephan Köster, Langerwehe (DE); Ibrahim Jamaladin, Kerpen (DE); Dominik Sernetz, Alpen (DE)

(73) Assignee: HANON SYSTEMS, Daejeon (KR)

( * ) Notice: Subject to any disclaimer, the term of this patent is extended or adjusted under 35 U.S.C. 154(b) by 311 days.

(21) Appl. No.: 16/125,898

(22) Filed: Sep. 10, 2018

(65) Prior Publication Data

US 2019/0086004 A1 Mar. 21, 2019

(30) Foreign Application Priority Data

Sep. 19, 2017 (DE) .................. 10 2017 121 639
Aug. 22, 2018 (DE) .................. 10 2018 120 464

(51) Int. Cl.

| | |
|---|---|
| *F16L 3/22* | (2006.01) |
| *F16L 58/18* | (2006.01) |
| *G01L 19/06* | (2006.01) |
| *F16L 23/00* | (2006.01) |
| *F16L 23/16* | (2006.01) |
| *F16L 23/028* | (2006.01) |

(Continued)

(52) U.S. Cl.
CPC ........... *F16L 3/222* (2013.01); *F16L 19/0218* (2013.01); *F16L 23/003* (2013.01); *F16L 23/0283* (2013.01); *F16L 23/16* (2013.01); *F16L 23/18* (2013.01); *F16L 58/187* (2013.01); *G01L 19/0672* (2013.01); *G01M 3/2853* (2013.01)

(58) Field of Classification Search
CPC ....... F16L 3/222; F16L 58/187; F16L 23/003; F16L 23/16; F16L 23/0283; F16L 19/0218; F16L 23/18; F16L 25/0018; G01L 19/0672; G01M 3/2853; F25B 41/00

See application file for complete search history.

(56) References Cited

U.S. PATENT DOCUMENTS

| 6,318,768 | B1 * | 11/2001 | Gehres | F16L 23/032 |
| | | | | 277/609 |
| 6,386,593 | B1 * | 5/2002 | Slais | B60H 1/00571 |
| | | | | 277/609 |
| 2009/0206596 | A1 * | 8/2009 | Wildermuth | F16L 19/0212 |
| | | | | 285/205 |

FOREIGN PATENT DOCUMENTS

| DE | 102006012915 A1 | 9/2007 |
| DE | 102006035717 A1 | 2/2008 |

(Continued)

*Primary Examiner* — James M Hewitt, II
(74) *Attorney, Agent, or Firm* — Shumaker, Loop & Kendrick, LLP; James D. Miller

(57) ABSTRACT

An arrangement for fluid-tight connecting of lines including a first and second connection element. The connection elements are aligned with each other and connected by a fastening mechanism. The arrangement includes an intermediate element between the connection elements and a holding element and a second sealing element. A first sealing element is arranged in the holding element between the sealing surfaces of the connection elements. The holding element has a hollow wall with a first and second edge. The second sealing element is connected to the holding element on the second edge. The intermediate element includes an indentation extending from a first end to a second end formed near the first sealing element. The first end has a conical shape, wherein oppositely arranged side walls of the indentation rest on one another on the outer side of the sealing element.

19 Claims, 2 Drawing Sheets

(51) Int. Cl.
  *G01M 3/28*    (2006.01)
  *F16L 19/02*   (2006.01)
  *F16L 23/18*   (2006.01)

(56) References Cited

FOREIGN PATENT DOCUMENTS

| | | |
|---|---|---|
| DE | 102007047807 A1 | 5/2009 |
| JP | 2004205041 A | 7/2004 |
| JP | 2005042815 A | 2/2005 |

* cited by examiner

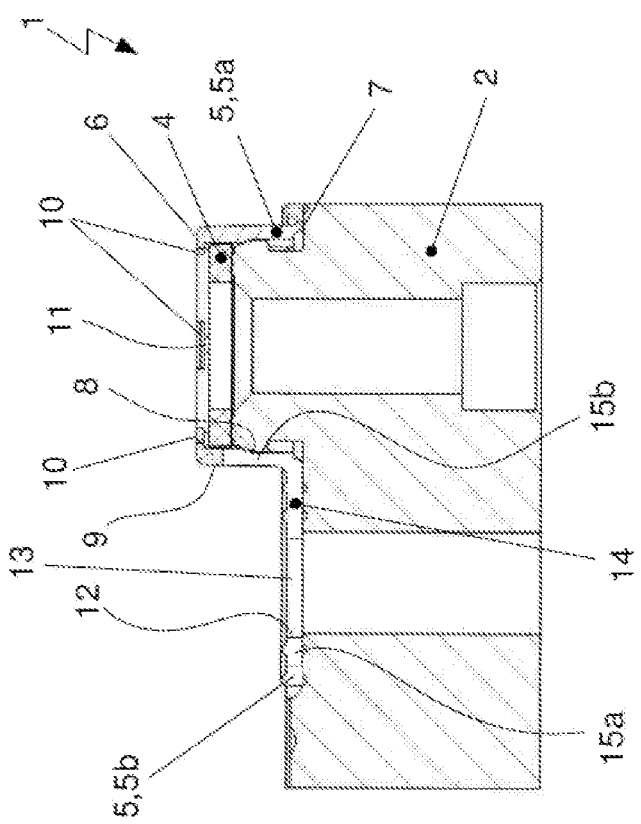
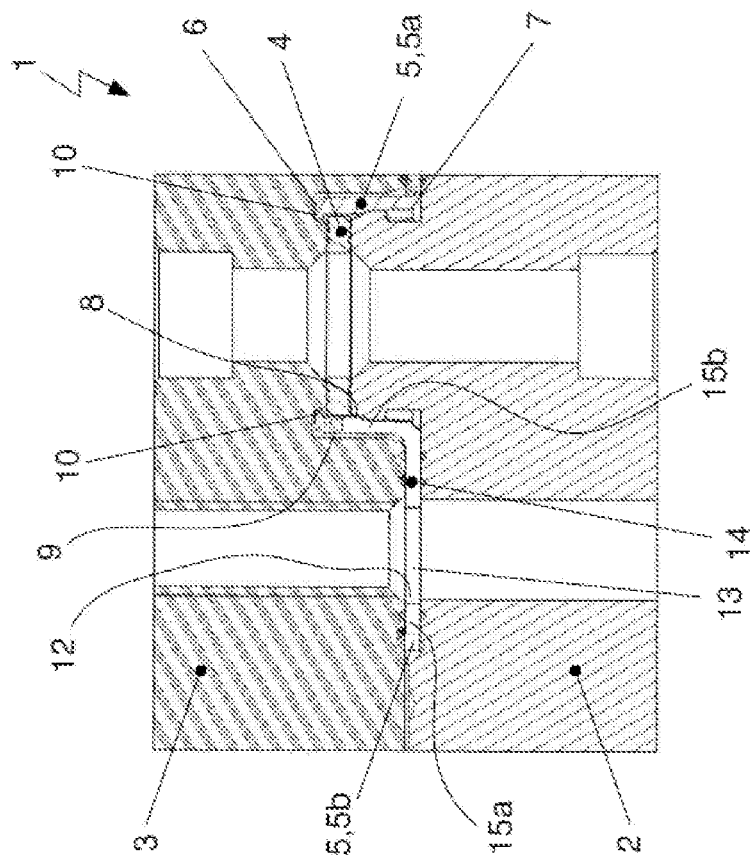
FIG. 1B
FIG. 1A

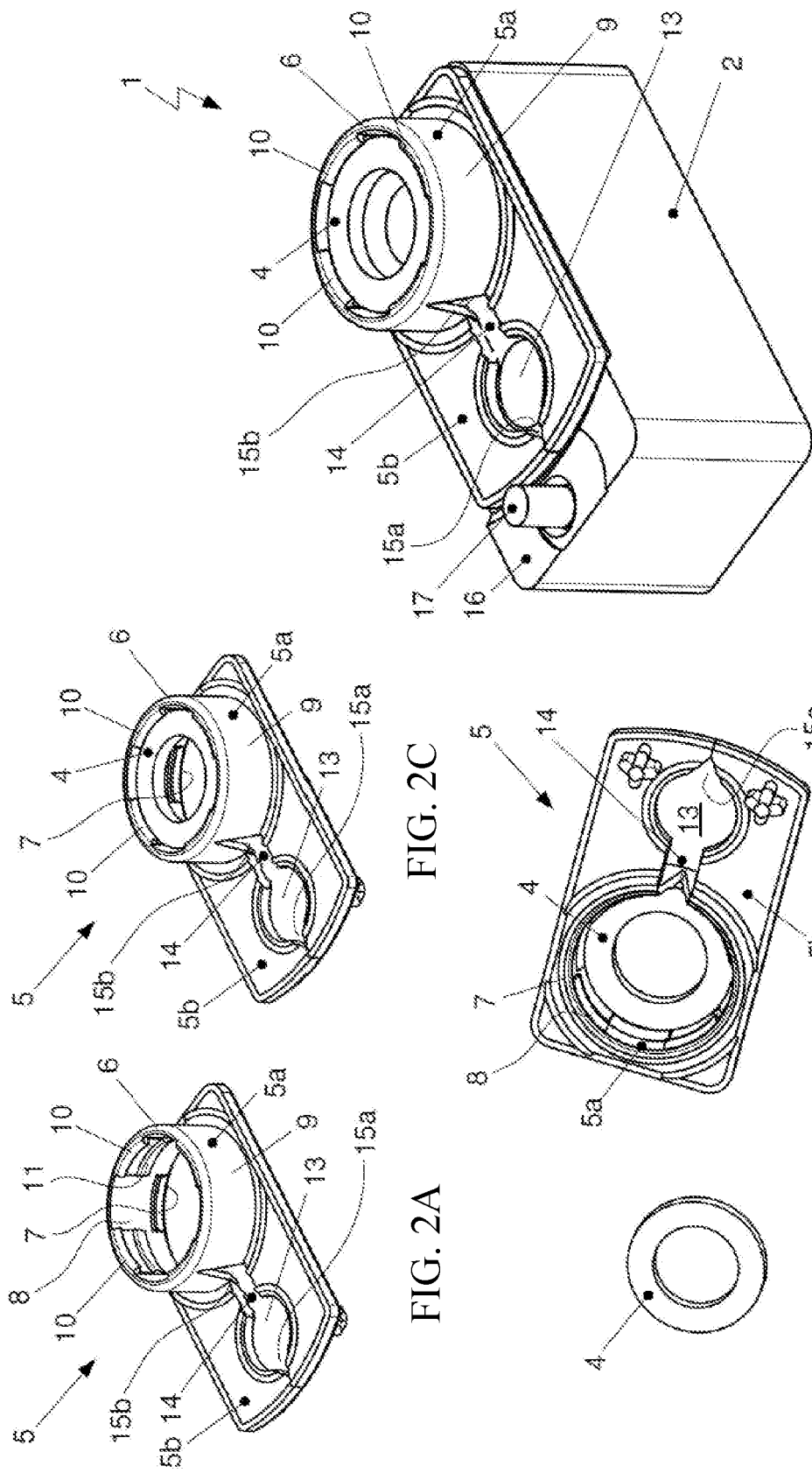

ARRANGEMENT FOR FLUID-SEALING CONNECTION OF LINES

CROSS-REFERENCE TO RELATED APPLICATIONS

This patent application claims priority to German patent application numbers DE 10 2017 121 639.1 filed Sep. 19, 2017 and DE 10 2018 120 464.7 filed Aug. 22, 2018. The entire disclosures of the above patent applications are hereby incorporated herein by reference.

FIELD

The invention relates to an arrangement for the fluid-tight connecting of lines, in particular of lines of a refrigeration circuit of an air-conditioning system of a motor vehicle. The arrangement comprises a first connection element tightly connected to an end piece of a first line and comprises a second connection element tightly connected to an end piece of a second line. The connection elements are formed on a side aligned with the other connection element and with a radially running sealing surface and are connected to one another by at least one fastening means.

BACKGROUND

Traditional arrangements for the fluid-tight connecting of lines comprise two connection elements with an intermediate element as an individual component which is arranged between the connection elements and is designed to meet a plurality of different functions. The main functions of the intermediate element consist in fixing and positioning a disk-shaped sealing element on a first connection element. The first connection element and a second connection element are connected in a fluid-tight manner to ends of pipes or lines, in particular refrigerant lines. The fixing of the disk-shaped sealing element in the axial direction is ensured on the one hand by the placing on the first connection element and on the other hand by the intermediate element. The disk-shaped sealing element is held in a radial direction by centering element formed on the inside of the intermediate element. Another function of the intermediate element consists in protecting an intermediate space formed between the two connection elements from the inflow of corrosive liquids and consequently from corrosion.

DE 10 2006 035 717 A1 discloses a sealing arrangement for connecting refrigerant lines. The sealing arrangement comprises a first connection element tightly connected to a first line part and comprises a second connection element tightly connected to a second line part. A sealing ring is arranged held by a holding device formed as a plastic cap with a through bore as intermediate element on the sealing surface of one of the two coupling parts. The plastic cap has a groove which reduces the material thickness of the plastic cap as a theoretical breaking point.

DE 10 2006 012 915 A1 and DE 10 2007 047 807 A1 each disclose a system for fixing seals with an intermediate element for connecting two lines for a fluid medium, in particular refrigerant lines, to line end parts. The intermediate element comprises a receptacle shaped like a hollow cylinder for a sealing ring with an outer wall and an inner wall as well as an upper and a lower edge. A level tear-off flap for dismounting the intermediate element is arranged on the lower edge and runs vertically to the outer wall of the intermediate element. According to DE 10 2011 047 807 A1 the tear-off flap is formed with a narrow slot extending from an outer edge of the tear-off flap in the direction of the outer wall.

The tear-off flap known from the prior art has an area, formed as a seal, of the intermediate element arranged between the connection elements, which area seals up to an internal pressure of about 30 bars independently of the arrangement of a defective sealing ring within the hollow cylindrical receptacle of the intermediate element. This prevents a robust ability to detect a possible leakage during the mounting process and during the connecting of the lines and connection elements.

The problem of the invention now is to make available an arrangement for the fluid-tight connecting of lines for a fluid medium, in particular refrigerant lines, to line end parts, which makes possible a reliable detecting of a possible leakage and also seals an intermediate space formed between the two connection elements and prevents a penetration of corrosive media into the intermediate space of the arrangement from the outside. The costs and the expense for the manufacture, maintenance and assembly of the arrangement should be minimal here.

SUMMARY

The problem is solved by the subject matter with the features shown and described herein.

The problem is solved by an arrangement according to the invention for the fluid-tight connecting of lines, in particular of lines of a refrigeration circuit of an air conditioning system of a motor vehicle. The arrangement comprises a first connection element tightly connected to an end part of a first line and comprises a second connection element tightly connected to an end part of a second line. The connection elements are formed on a side which is aligned with the other connection element and has a radially running sealing surface and are connected to one another by at least one fastening means. The end parts of the lines are advantageously coupled to each other by a through opening formed in the connection elements.

In addition, the arrangement comprises an intermediate element arranged between the connection elements and with a holding element and a strip-shaped second sealing element. A first sealing element is arranged in the holding element and between the sealing surfaces of the connection elements. The shape of a strip denotes a band-like shape which is on the one hand long and on the other hand narrow. The first sealing element preferably has the shape of a disk, in particular of a circular disk.

The holding element is constructed with a hollow cylindrical wall aligned in an axial direction with a first edge on the front side and with a second edge and with an inner side and an outer side. The second sealing element is firmly connected to the holding element on the second edge of the holding element, preferably over the entire circumference.

According to the design of the invention, the intermediate element has an indentation extending as a groove from a first end formed on an outer side of the second sealing element to a second and formed in an area of the first sealing element on the holding element. The first end is formed with a conical shape, wherein oppositely arranged side walls of the indentation rest on one another on the outside of the sealing element.

According to a further development of the invention, an interval formed between the oppositely arranged side walls of the indentation constantly increases starting from the outside of the sealing element in the direction of the indentation.

According to an advantageous embodiment of the invention the at least one fastening means is constructed as a screw connection. Here, a screw is arranged run through passage openings formed inside the connection elements and through a passage opening formed in the second sealing element of the intermediate element. The passage openings of the connection elements and the passage opening of the intermediate element are preferably aligned on a common central axis and are formed laterally offset from the sealing surfaces of the connection elements.

Another advantage of the invention is that the indentation extends from the first end to the passage opening formed in the second sealing element and from the passage opening to the second edge of the holding element and from the second edge of the holding element to the second end. The indentation is constructed preferably extending along an axis of symmetry of the intermediate element.

In addition, an interval formed between the oppositely arranged side walls of the indentation of the indentation preferably constantly increases starting from the outer side of the sealing element in the direction of the passage opening. An interval formed between the opposingly arranged side walls of the indentation can be constant, starting from the passage opening to the second end of the indentation.

According to a further development of the invention, the indentation is formed as a through groove or as a through slot which extends from an upper side to a lower side of the flat and strip-shaped second sealing element and from the outer side to the inner side of the wall of the holding element. The indentation is advantageously aligned inside the wall of the holding element and in the axial direction of the holding element.

Therefore, the slot-shaped indentation forms a flow channel limited by the sidewalls of the indentation and by the connection elements inside the intermediate element in the mounted state of the arrangement, which channel extends from an outer side of the intermediate element to the area of the first sealing element. The second end of the indentation is preferably formed under the first edge of the holding element.

According to an advantageous embodiment of the invention, the flow channel is configured on the first end of the indentation in the form of a valve, in particular of a pressure retention valve, for a unidirectional flow through from the second end to the first end of the indentation. The first end of the indentation is preferably formed in such a manner here as to close up to an inner pressure of at least 3 bars.

The second sealing element of the intermediate element, which sealing element is preferably arranged in a plane aligned vertically to the longitudinal axis of the holding element, is advantageously positioned in an intermediate space formed between the connection elements.

According to a further development of the invention, radially inwardly extending formations are formed on the inner side of the wall of the holding element in the area of the first edge and can have the shape of webs in the shape of circular sections.

Centering elements for the first sealing element are preferably additionally provided which taper in the axial direction from the second edge in the direction of the first edge in a radial direction on the inner side of the holding element wall.

The arrangement according to the invention has various other advantages:

It makes possible a reliable detecting of a leakage and an optimal mounting of the individual component so that A rapid, time-saving and simple determination of the leakage takes place during the final controls of the arrangement provided to this end within the refrigeration circuit, as a result of which a loss of the refrigerant and a subsequent post-working and the associated expenses are avoided, Preventing an unrecognized outflow of the fluid circulating in the lines, in particular of refrigerant, and therefore taking care of the environment, A sealing of the intermediate space formed between the connection elements and the preventing of a penetration of corrosive media into the intermediate space of the arrangement from the outside, and Protection against corrosion between the connection elements and the first sealing element.

BRIEF DESCRIPTION OF THE DRAWINGS

Other details, features and advantages of embodiments of the invention result from the following description of the exemplary embodiments with reference made to the associated drawings. In the drawings:

FIG. 1A: shows an arrangement for the fluid-type connecting of refrigerant lines to line end parts with a first and with a second connection element and with an intermediate element with a holding element with an inserted, first sealing element and with a second sealing element in a sectional view;

FIG. 1B: Shows the second connection element of the arrangement with the intermediate element and the inserted sealing element of FIG. 1a in a sectional view;

FIG. 2A: shows an intermediate element with the holding element for the first sealing element and with the second sealing element in a perspective view;

FIG. 2B: shows the first sealing element in a perspective view;

FIGS. 2C and 2D: show the first sealing element inserted into the holding element of the intermediate element in a perspective view viewed in the direction from above and from below; and FIG. 2E: shows the second connection element of the arrangement with the intermediate element and the first sealing element inserted in the holding element of the intermediate element in a perspective view.

DETAILED DESCRIPTION OF EXEMPLARY EMBODIMENTS OF THE INVENTION

FIG. 1A shows an arrangement 1 for the fluid-type connecting of refrigerant lines to line end parts with the first connection element 2 and the second connection element 3 and with an intermediate element 5 arranged between the connection elements 2, 3 and with a holding element 5a into which a first sealing element 4 is inserted, and with a second sealing element 5b in a sectional view. The first sealing element 4 is held inside the holding element 5a as a section of the intermediate element 5. In FIG. 1B the first connection element 2 of the arrangement 1 is shown with the intermediate element 5 and the first sealing element 4 inserted inside the holding element 5a, also in a sectional view.

A first line, which is not shown, is introduced by an end part into the first connection element 2 and a second line, which is not shown, is introduced by an end part into the second connection element 3. The lines are connected firmly and fluid-tightly to the particular connection element 2, 3. The connection elements 2, 3 are connected in the area of the introduced end parts of the lines via the intermediately supported, first sealing element 4 in a fluid-tight manner and mechanically coupled by a fastening means. The connection elements 2, 3 have a radially running sealing surface on a side aligned toward the other connection element 2, 3.

A mechanical coupling of the connection elements 2, 3 can be established by a screw connection. In it, the screw is arranged run through passage openings formed inside the connection elements 2, 3 and through a passage opening 13 of the intermediate element 5. The passage openings of the connection elements 2, 3 and the passage opening 13 of the intermediate element 5 are aligned on a common central axis and arranged laterally offset from the sealing surfaces of the connection elements 2, 3.

An intermediate space 12 is formed between the facing ends of the passage openings of the connection elements 2, 3. A section of the intermediate element 5, in particular a section constructed as a second sealing element 5b, is arranged inside the intermediate space 12 which section especially prevents a penetration of corrosive media into the intermediate space 12, for example, through the passage openings of the connection elements 2, 3 and therefore also to the holding element 5a with the first sealing element 4.

The intermediate element 5 comprises the holding element 5a for fixing the disk-shaped first sealing element 4, wherein the sealing element 4 is arranged inside the holding element 5a constructed substantially as a hollow, cylindrical receptacle. The holding element 5 is constructed with a wall aligned in an axial direction with a first, upper edge 6 and with a second, lower edge 7 on a front side and with an inner side 8 and an outer side 9. The inner side 8 and the outside 9 of the jacket of the hollow cylinder extend from the first edge 6 to the second edge 7.

The wall of the holding element 5a, which wall is preferably constructed from a plastic, comprises radially outwardly projecting formations 10 on the first, axially upper edge 6 with which the first, disk-shaped sealing element 4 is fixed in an axial direction in particular during the procedure of the mounting of the arrangement 1 between the sealing surface of the first connection element 2 and the formations 10 constructed as webs with a circular section. Consequently, a change in the position of the first sealing element 4 received by the holding element 5a is prevented by the at least two formations 10 arranged in particular oppositely.

In addition, centering elements 11 tapering in an axial direction from the lower, second edge 7 in the direction of the upper, first edge 6 in a radial direction for fixing the first, circular, disk-shaped sealing element 4 in the radial direction are formed on the inner side 8 of the wall of the holding element 5a. The distance in a radial direction between oppositely arranged centering elements 11 becomes step-by-step smaller so that the sealing element 4 is pushed into the holding element 5a during the introduction process from the lower edge 7 to the upper edge 6 up to the circular, section-shaped webs of the formations 10 and is clamped between the centering elements 11 formed on the circumference of the inner side 8.

The holding element 5a is designed in combination with the first sealing element 4 in such a manner as to fix the first sealing element 4 inside the holding element 5a. In addition, the intermediate element 5 with the holding element 5a is constructed in combination with the connection elements in such a manner as to arrange the holding element 5a with the first sealing element 4 fixed in the holding element 5a between the sealing surfaces of the connection elements 2, 3, wherein the holding element 5a can be readily fastened between the sealing surfaces before the mounting, in particular before a screwing of the connection elements 2, 3. The intermediate element 5 with the holding element 5a should be placed on or clipped on one of the connection elements 2, 3.

The second sealing element 5b aligned vertically to the wall of the holding element 5a is arranged on the lower, second edge 7 of the holding element 5a. Consequently, the second sealing element 5b constructed in particular from an elastomer is constructed in a plane aligned vertically to the longitudinal axis of the holding element 5a and is firmly connected to the holding element 5a almost over the entire circumference. The second sealing element 5b comprises a collar running around the outer circumference, a collar running around the holding element 5a in a radial direction at a constant distance and comprises a collar running around the circular passage opening 13 for the fastening means.

Therefore, the connection elements 2, 3 are sealed against one another on the sealing surfaces and on the first sealing element 4 arranged and supported intermediately and in the area of the lower edge 7 of the holding element 5b and in the area around the passage opening 13. The first sealing element 4 serves in particular for the sealing of the fluid channeled through the lines connected to the connection elements 2, 3, especially to prevent leakage of a fluid channeled through the lines. The second sealing element 5b of the intermediate element serves primarily to prevent the penetration of corrosive media from the outside between the connection elements 2, 3, in particular into the intermediate space 12.

The second sealing element 5b is formed with an indentation 14 in the form of a slot which extends from a first end 15a on an outer side of the sealing element 5b to the passage opening 13 for receiving a fastening means and from the passage opening 13 to the second, lower edge 7 of the holding element 5a. Inside the wall of the holding element 5a the indentation 14 is continued as an extension of the slot formed in the second sealing element 5b and extends in an axial direction of the holding element 5a up to into the area of the receptacle of the first sealing element 4. The indentation 14 extends up to a second end 15b under the first, upper edge 6 of the holding element 5a.

In addition, a second sealing element known from the prior art and which is not shown and is constructed without a cited indentation 14 also seals off the lines connected to the connection elements 2, 3 independently of a defective first sealing element 4 inside the hollow cylindrical holding element. The second sealing element can seal off the lines up to an internal pressure of approximately 30 bars.

However, the arrangement of the not-shown, second sealing element from the prior art also prevents the detecting of a possible leakage of a fluid flowing through the lines, for example, due to a lacking or damaged first sealing element 4 or two defective connections of the fastening means inside the arrangement 1, for example during the mounting procedure or during the connecting of the lines and connection elements.

FIGS. 2A and 2C to 2E show an intermediate element 5 with the holding element 5a for the first sealing element 4 and with the second sealing element 5b of the arrangement 1. The FIG. 2A shows the intermediate element 5, the FIG. 2B shows the first sealing element 4, the FIG. 2C and FIG. 2D show the holding element 5a of the intermediate element 5 with the inserted and pre-mounted, first sealing element 4 in each case viewed from above and from below and the FIG. 2 E shows the first connection element 2 of the arrangement 1 with the intermediate element 5 set on it and with the first sealing element 4 inserted in the holding element 5a of the intermediate element 5, in a perspective view in each case.

The second sealing element 5b is provided with the indentation 14, which is constructed as a slot extending continuously on the one hand from an upper side to a lower side of the flat and strip-shaped sealing element 5b. On the other hand, the indentation 14 extends from the first end 15a on an outer side of the sealing element 5b to the passage opening 13, from the passage opening 13 to the second, lower edge 7 of the holding element 5a and inside the wall of the holding element 5a in an axial direction of the holding element 5a into the area of the receptacle of the first sealing element 4. Even inside the wall of the holding element 5a, the indentation 14 is constructed as a slot extending through the wall. The indentation 14 runs here preferably along an axis of symmetry of the intermediate element 5.

In the mounted state of the arrangement 1 with the connection elements 2, 3 and the intermediate element 5 supported in an intermediary manner and with the holding element 5a with the first sealing element 4 and the second sealing element 5b, the slot-type indentation 14 inside the intermediate element 5 forms a flow channel extending from the area of the first sealing element 4 to the outer side of the intermediate element 5 and therefore to the surroundings of arrangement 1.

The first end 15a of the indentation 14, which end is formed inside the second sealing element 5b, has a conical shape, wherein the opposing side walls of the indentation 14 rest on one another on the outer edge and the indentation 14 continuously widens out in the direction of the passage opening 13 in its further course in the direction of the passage opening 1 up to the passage opening 13. The interval of the opposing side walls of the indentation 14 continuously increases in the direction of the passage opening 13. The interval of the opposing side walls of the indentation 14 between the passage opening 13 and the second end 15b is substantially constant.

The flow channel formed by the indentation 14 in the mounted state of the arrangement 1 fulfils the function of a valve with the conical shape of the indentation 14 in the area of the first end 15a and makes possible a unidirectional flowthrough from the second end 15b to the first end 15a and therefore out of the arrangement 1 into the surroundings. Therefore, for example a leakage flow of the fluid flowing through the lines coupled to one another by the connection elements 2, 3 as a consequence of a non-tight or lacking first sealing element 4 can be channeled to the outside. The leakage flow of the fluid through the connection of the line can be detected.

The conical construction of the first end 15a of the indentation 14 makes a relaxing of the fluid pressure to the outside possible. The valve designed in this manner is closed or fluid-tight up to a value of the inner pressure of at least 3 bars so that on the one hand no leakage flow of the fluid flowing through the lines coupled to one another by the connection elements 2, 3 occurs, and on the other hand no corrosive medium such as water, in particular salt water, flows into the arrangement 1, in particular into the intermediate space 12 of the arrangement 1. The first end 15a of the indentation 14 is constructed similar to a pressure retention valve.

The valve opens at a value of the internal pressure of approximately 6 bars, which as a result of a non-tight or lacking first sealing element 4 or a non-tight connection of the connection elements 2, 3 inside the flow duct formed by the indentation 14, therefore acts on the valve as the first end 15a of the flow duct so that on the one hand a leakage flow of the fluid flowing through the lines coupled by the connection elements 2, 3 coupled to one another exits to the outside. In this manner in particular a refrigerant can escape into the surroundings even at relatively low values of the pressure from a refrigeration circuit and be detected. On the other hand, a simultaneous penetration of the corrosive medium into the opposed arrangement 1 continues to be prevented. The corrosion protection of the arrangement 1 is given at all times by the total-surface pressing of the second sealing element 5b of the intermediate element 5.

The arrangement 1 is mounted in the sequence shown in the FIG. 2A to 2E. In it, the disk-shaped first sealing element 4 is inserted starting from the lower edge 7 into the hollow-cylinder receptacle of the holding element 5a and pushed in an axial direction up to the formations 10 projecting radially inward on the upper edge 6 and constructed as webs with a circular section. The sealing element 4 is fixed between the centering elements 11 formed on the inner side 8 of the wall of the holding element 5a and tapering in an axial direction from the lower, second edge 7 in the direction of the upper, first stage 6 in a radial direction, which is apparent in particular from the FIGS. 2C and 2D.

The intermediate element 5 with the holding element 5a and with the first sealing element 4 fixed in the holding element 5a is subsequently arranged between the sealing surfaces of the connection elements 2, 3, wherein the holding element 5a is arranged before the mounting, in particular before a screwing of the connection elements 2, 3, between the sealing surfaces of the connection elements 2, 3. The intermediate element 5 with the holding element 5a and the first sealing element 4 is placed or inserted or clipped on the first connection element 2. The intermediate element 5 with the holding element 5a and with the first sealing element fixed in the holding element 5a is pre-mounted on the first connection element 2.

The connection elements 2, 3 are then connected to one another by a fastening means, in particular screwed. The first connection element 2 is formed at a distance from the passage opening 13 and from a screw run through the passage opening 13 on a side facing away from the sealing surfaces of the connection elements 2, 3 and with a support surface 16. The support surface 16 is arranged in such a manner as to generate a lever action during the screwing of the connection elements 2, 3 which leads to the uniform compression of the sealing element 4 arranged between the sealing surfaces of the connection elements 2, 3. In addition, a pin-like form element 17 is provided which is aligned projecting out of the support surface 16 of the first connection element 2 and serves during the mounting of the arrangement 1 to guide the second connection element 3.

LIST OF REFERENCE NUMERALS 1 arrangement
2 first connection element
3 second connection element
4 first sealing element
5 intermediate element
5a holding element first sealing element 4
5b second sealing element
6 first edge holding element 5a
7 second edge holding element 5a
8 inner side holding element 5a 9 outer side holding element 5a
10 formation
11 centering element
12 intermediate space
13 passage opening
14 indentation
15a first end indentation 14
15b second end indentation 14
16 support surface
17 form element

What is claimed is:

1. An arrangement for fluid-tight connecting of lines of a refrigeration circuit of an air-conditioning system of a motor vehicle, comprising a first connection element tightly connected to an end part of a first line and comprising a second connection element tightly connected to an end part of a second line, wherein each of the first connection element and the second connection element has a radially running sealing surface on a side aligned with a respective one of the first connection element and the second connection element and wherein the first connection element and the second connection element are connected to one another by at least one fastening means; and an intermediate element arranged between the first connection element and the second connection element and comprising a holding element and a first sealing element arranged in the holding element and between the sealing surface of each of the first connection element and the second connection element and comprising a strip-shaped second sealing element, wherein the holding element is constructed with a hollow cylindrical wall aligned in an axial direction with a first edge and with a second edge and with an inner side and an outer side, wherein the second sealing element is firmly connected to the holding element on the second edge of the holding element, wherein the intermediate element further comprises an indentation which extends as a groove from a first end formed on an outer side of the second sealing element up to a second end formed in an area of the first sealing element on the holding element, and wherein the first end has a conical shape and opposingly arranged side walls of the indentation rest on one another on the outer side of the second sealing element, wherein the indentation is formed as a through groove which extends from an upper side to a lower side of the strip-shaped, second sealing element and from the outer side to the inner side of the wall of the holding element, wherein a flow channel is formed between the first connection element and the second connection element and the opposingly arranged side walls of the indentation and wherein the flow channel is configured on the first end as a valve for a unidirectional flowthrough from the second end to the first end of the indentation.

2. The arrangement according to claim 1, wherein an interval formed between the opposingly arranged side walls of the indentation constantly increases starting from the outer side of the second sealing element in a direction of the indentation.

3. The arrangement according to claim 1, wherein the at least one fastening means is a screw connection, wherein a screw is arranged through passage openings formed inside the first connection element and the second connection element and through a passage opening formed in the second sealing element of the intermediate element.

4. The arrangement according to claim 3, wherein the indentation extends from the first end to the passage opening formed in the second sealing element and from the passage opening to the second edge of the holding element and from the second edge of the holding element to the second end.

5. The arrangement according to claim 4, wherein the indentation is constructed extending along an axis of symmetry of the intermediate element.

6. The arrangement according to claim 4, wherein an interval formed between the opposingly arranged side walls of the indentation constantly increases starting from the outer side of the sealing element in the direction of the passage opening.

7. The arrangement according to claim 4, wherein an interval formed between the opposingly arranged side walls of the indentation is constant, starting from the passage opening to the second end.

8. The arrangement according to claim 1, wherein the first end of the indentation capable of enclosing up to an internal pressure of at least 3 bars.

9. The arrangement according to claim 1, wherein the indentation is constructed inside the wall of the holding element in an axial direction of the holding element.

10. The arrangement according to claim 1, wherein the second end of the indentation is formed under the first edge of the holding element.

11. The arrangement according to claim 1, wherein the second sealing element is arranged in a plane aligned vertically to a longitudinal axis of the holding element.

12. The arrangement according to claim 1, wherein the second sealing element of the intermediate element is arranged in an intermediate space formed between the first connection element and the second connection element.

13. The arrangement according to claim 1, wherein the first sealing element is formed as a disk.

14. The arrangement according to claim 1, wherein radially inwardly projecting formations are formed on the inner side of the wall of the holding element in an area of the first edge.

15. The arrangement according to claim 14, wherein the formations are formed as webs with a circular section.

16. The arrangement according to claim 1, wherein centering elements tapering in an axial direction from the second edge in a direction of the first edge in a radial direction are formed on the inner side of the wall of the holding element.

17. The arrangement according to claim 1, wherein the end part of the first line and the end part of the second line are connected to one another by a passage opening formed in the first connection element and the second connection element.

18. An arrangement for fluid-tight connecting of lines of a refrigeration circuit of an air-conditioning system of a motor vehicle, comprising a first connection element tightly connected to an end part of a first line and comprising a second connection element tightly connected to an end part of a second line, wherein each of the first connection element and the second connection element has a radially running sealing surface on a side aligned with a respective one of the first connection element and the second connection element and wherein the first connection element and the second connection element are connected to one another by at least one fastening means; and an intermediate element arranged between the first connection element and the second connection element and comprising a holding element and a first sealing element arranged in the holding element and between the sealing surface of each of the first connection element and the second connection element and comprising a strip-shaped second sealing element, wherein the holding element is constructed with a hollow cylindrical wall aligned in an axial direction with a first edge and with a second edge and with an inner side and an outer side, wherein the second sealing element is firmly connected to the holding element on the second edge of the holding element, wherein the intermediate element further comprises an indentation which extends as a groove from a first end formed on an outer side of the second sealing element up to a second end formed in an area of the first sealing element on the holding element, and wherein the first end has a conical shape and opposingly arranged side walls of the indentation rest on one another on the outer side of the second sealing element, wherein the indentation is formed as a through groove which extends from an upper side to a lower side of the strip-shaped, second sealing element and from the outer side to the inner side of the wall of the holding element, and wherein the indentation is constructed inside the wall of the holding element in an axial direction of the holding element.

19. An arrangement for fluid-tight connecting of lines of a refrigeration circuit of an air-conditioning system of a motor vehicle, comprising a first connection element tightly connected to an end part of a first line and comprising a second connection element tightly connected to an end part of a second line, wherein each of the first connection element and the second connection element has a radially running sealing surface on a side aligned with a respective one of the first connection element and the second connection element and wherein the first connection element and the second connection element are connected to one another by at least one fastening means; and an intermediate element arranged between the first connection element and the second connection element and comprising a holding element and a first sealing element arranged in the holding element and between the sealing surface of each of the first connection element and the second connection element and comprising a strip-shaped second sealing element, wherein the holding element is constructed with a hollow cylindrical wall aligned in an axial direction with a first edge and with a second edge and with an inner side and an outer side, wherein the second sealing element is firmly connected to the holding element on the second edge of the holding element, wherein the intermediate element further comprises an indentation which extends as a groove from a first end formed on an outer side of the second sealing element up to a second end formed in an area of the first sealing element on the holding element, and wherein the first end has a conical shape and opposingly arranged side walls of the indentation rest on one another on the outer side of the second sealing element, wherein a flow channel is formed between the first connection element and the second connection element and the opposingly arranged side walls of the indentation and wherein the flow channel is configured on the first end as a valve for a unidirectional flowthrough from the second end to the first end of the indentation, and wherein the indentation is constructed inside the wall of the holding element in an axial direction of the holding element.

\* \* \* \* \*